United States Patent
Kim et al.

(10) Patent No.: US 9,417,751 B2
(45) Date of Patent: Aug. 16, 2016

(54) PLATE MEMBER FOR TOUCH PANEL AND METHOD OF MANUFACTURING THE SAME

(75) Inventors: Byung Soo Kim, Seoul (KR); Keun Sik Lee, Seoul (KR); Chung Won Seo, Seoul (KR); Ji Won Jo, Seoul (KR); Hyuk Jin Hong, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 158 days.

(21) Appl. No.: 13/501,980

(22) PCT Filed: Oct. 15, 2010

(86) PCT No.: PCT/KR2010/007088
§ 371 (c)(1),
(2), (4) Date: Apr. 13, 2012

(87) PCT Pub. No.: WO2011/046390
PCT Pub. Date: Apr. 21, 2011

(65) Prior Publication Data
US 2012/0202077 A1     Aug. 9, 2012

(30) Foreign Application Priority Data
Oct. 16, 2009 (KR) ............ 10-2009-0098822

(51) Int. Cl.
*B32B 18/00*     (2006.01)
*G06F 3/045*     (2006.01)

(52) U.S. Cl.
CPC ............ *G06F 3/045* (2013.01)

(58) Field of Classification Search
None
See application file for complete search history.

(56) References Cited

U.S. PATENT DOCUMENTS

| | | | | |
|---|---|---|---|---|
| 4,410,563 A | * | 10/1983 | Richter et al. | 427/108 |
| 5,167,000 A | * | 11/1992 | Minemoto et al. | 385/122 |
| 5,652,674 A | * | 7/1997 | Mizuuchi et al. | 359/326 |
| 5,936,340 A | * | 8/1999 | Bechtel et al. | 313/461 |
| 6,774,558 B2 | * | 8/2004 | Otani et al. | 313/489 |
| 2003/0180544 A1 | * | 9/2003 | Murphy | 428/428 |
| 2009/0120496 A1 | | 5/2009 | Cording et al. | |
| 2009/0250668 A1 | * | 10/2009 | Shimane et al. | 252/519.51 |
| 2011/0012842 A1 | | 1/2011 | Lee et al. | |
| 2011/0180789 A1 | * | 7/2011 | Han et al. | 257/40 |

FOREIGN PATENT DOCUMENTS

| | | |
|---|---|---|
| JP | 11-181385 A | 7/1999 |
| JP | 2002-055228 A | 2/2002 |
| JP | 2002-260447 A | 9/2002 |
| JP | 2004-192003 A | 7/2004 |

(Continued)

OTHER PUBLICATIONS

Office Action dated Aug. 8, 2013 in Taiwanese Application No. 099135284, filed Oct. 15, 2010.

(Continued)

*Primary Examiner* — Humera Sheikh
*Assistant Examiner* — Seth Dumbris
(74) *Attorney, Agent, or Firm* — Saliwanchik, Lloyd & Eisenschenk

(57) ABSTRACT

A plate member for touch panel and a method of manufacturing the same are provided. The plate member for touch panel includes: a transparent substrate; an intermediate transparent layer on the transparent substrate; and a conductive transparent layer on the intermediate transparent layer, wherein at least one of the intermediate transparent layer and the conductive transparent layer includes a peroxide composition.

2 Claims, 2 Drawing Sheets

(56) References Cited

FOREIGN PATENT DOCUMENTS

| | | | | |
|---|---|---|---|---|
| JP | 2006-324105 | * | 11/2006 | ............ H01B 13/00 |
| JP | 2007-134293 A | | 5/2007 | |
| JP | 2007-298732 | * | 11/2007 | ............ G02F 1/1333 |
| JP | 2007-298732 A | | 11/2007 | |
| KR | 10-0893499 B1 | | 4/2009 | |
| TW | 200938501 A | | 9/2009 | |

OTHER PUBLICATIONS

International Search Report in International Application No. PCT/KR2010/007088, filed Oct. 15, 2010.

Office Action dated Jul. 9, 2013 in Japanese Application No. 2012-534118, filed Oct. 15, 2010.

* cited by examiner

PLATE MEMBER FOR TOUCH PANEL AND METHOD OF MANUFACTURING THE SAME

CROSS-REFERENCE TO RELATED APPLICATIONS

This application is the U.S. national stage application of International Patent Application No. PCT/KR2010/007088, filed Oct. 15, 2010, which claims priority to Korean Application No. 10-2009-0098822, filed Oct. 16, 2009, the disclosures of each of which are incorporated herein by reference in their entirety.

TECHNICAL FIELD

The present disclosure relates to a plate member for touch panel and a method of manufacturing the same.

BACKGROUND ART

In the latest diverse electronic products, a touch panel with an inputting method through which a finger or an input device such as a stylus is used to contact an image displayed on a display device is applied.

The touch panel may be divided into a touch panel of a resistive layer type and a touch panel of an electrostatic capacity type. In the touch panel of a resistive layer type, a position is detected when an electrode becomes a short circuit by pressure of an input device. In the touch panel of an electrostatic capacity type, a position is detected when an electrostatic capacity between electrodes is changed by finger contact.

Referring to FIG. 4, the touch panel of a resistive layer type or the touch panel of an electrostatic capacity type includes a sensing pattern 110 formed by patterning a conductive transparent layer.

Stains or haze 120 may occur due to an etching solution used during a patterning process to form the sensing pattern 110. This is because the etching solution used for a patterning process is a strong mixed acid that is a result of adding glycolic acid or acetic acid to hydrochloric acid. Additionally, this etching solution of a strong acid may damage a conductive transparent layer and an intermediate transparent layer (e.g., a $SiO_2$ layer) and thus a crack in the intermediate transparent layer progresses into the conductive transparent layer, so that its durability may be decreased.

DISCLOSURE OF INVENTION

Technical Problem

Embodiments provide a plate member for touch panel improving electrical and optical characteristics in addition to preventing stains and improving durability and a method of manufacturing the same.

Solution to Problem

In one embodiment, a plate member for touch panel includes: a transparent substrate; an intermediate transparent layer on the transparent substrate; and a conductive transparent layer on the intermediate transparent layer, wherein at least one of the intermediate transparent layer and the conductive transparent layer includes a peroxide composition.

The intermediate transparent layer may include a peroxide composition with at least one of $SiO_3$ and $SiO_4$.

The conductive transparent layer may include a peroxide composition that oxygen is further bonded with an Indium Tin Oxide (ITO).

The intermediate transparent layer includes a peroxide composition with at least one of $SiO_3$ and $SiO_4$, and the conductive transparent layer includes a peroxide composition that oxygen is further bonded with an ITO.

The transparent substrate may be a plastic sheet or a plastic film.

A method of manufacturing a plate member for touch panel includes: forming an intermediate transparent layer on a transparent substrate; and forming a conductive transparent layer on the intermediate transparent layer, wherein at least one of the intermediate transparent layer and the conductive transparent layer includes a peroxide composition.

The intermediate transparent layer may include a peroxide composition.

The method may further includes: before the forming of the intermediate transparent layer, forming a peroxide composition by injecting oxygen gas into oxide gas; and during the forming of the intermediate transparent layer, forming the intermediate transparent layer by depositing the peroxide composition on the transparent substrate.

The forming of the peroxide composition may include generating a peroxide composition with at least one of $SiO_3$ and $SiO_4$ by injecting oxygen gas into $SiO_2$ gas.

The conductive transparent layer may include a peroxide composition.

The forming of the conductive transparent layer may include: forming a peroxide composition by injecting oxygen gas into oxide gas; and depositing the peroxide composition on the intermediate transparent layer.

The forming of the conductive transparent layer may include: generating an ITO peroxide composition bonded with more oxygen by injecting oxygen gas into ITO gas; and depositing the ITO peroxide composition on the intermediate transparent layer.

The transparent substrate may be a plastic sheet or a plastic film.

The details of one or more embodiments are set forth in the accompanying drawings and the description below. Other features will be apparent from the description and drawings, and from the claims.

Advantageous Effects of Invention

According to one embodiment of the present invention, stains or haze between patterns of a conductive transparent layer can be prevented, and durability of an intermediate transparent layer. Thus, electrical and optical characteristics of a touch panel can be improved.

BEST MODE FOR CARRYING OUT THE INVENTION

In the descriptions of embodiments, it will be understood that when a layer (or film), a region, a pattern, or a structure is referred to as being 'on/above' or 'below/under' a substrate, a layer, (or film), a region, or a pattern, it can be directly 'on/above' or 'below/under' the substrate, the layer (or film), the region, or the pattern, intervening layers may also be present. Reference about 'on/above' or 'below/under' of each layer will be described based on the accompanying drawings.

In the accompanying drawings, the thickness or size of each layer (or film), region, pattern or structure may be modified for clarity and convenience and thus does not entirely reflect an actual size thereof.

Hereinafter, embodiments will be described in detail with reference to the accompanying drawings.

Figure 1:
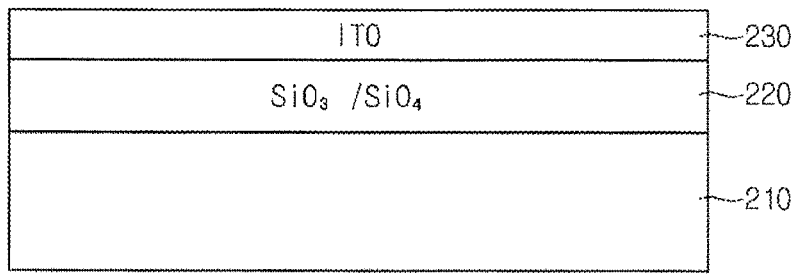
FIG. 1 is a sectional view of a plate member for touch panel according to a first embodiment.

FIG. 1 is a sectional view of a plate member for touch panel according to a first embodiment.

Referring to FIG. 1, the plate member for touch panel includes a transparent substrate 210, an intermediate transparent layer 220, and a conductive transparent layer 230. Although it is illustrated in the drawings that the conductive transparent layer 230 is not patterned, the conductive transparent layer 230 may be patterned and this also belongs to the scope of the present invention.

In more detail, the transparent substrate 210 is a plastic sheet or a plastic film. For example, the plastic material may use Acrylic resin, Polycarbonate resin, Polyrthylene napthalate resin, Polyethylene terephthalate (PET) resin, Poly Propylene resin, Poly aryl resin, Polyether sulfone (PES) resin, PolyMethly Pentene resin, Poly Ether Ether Ketone resin, Polysulfone (PSF) resin, Acetic cellulose resin, Amorphous polyolefin resin, Polyethylene resin, Polyester resin, Epoxy resin, Polyamide resin, PAI resin, PPS resin, PEI resin, Olefin resin, Vinyl resin, and Fluorine resin.

Moreover, the intermediate transparent layer 220 on the transparent substrate 110 is a composition that oxygen is further bonded with transparent oxides (e.g., an oxide such as $SiO_2$, $Al_2O_3$, $SiO$, $InO_3$, $HfO_2$, $Pb_5O_{11}$, $TiO_2$, and $Ta_2O_5$). Hereinafter, throughout the specification, a composition that oxygen is further bonded with a composition of a transparent oxide is referred to as a peroxide composition. Here, the bonding includes various chemical bonds (where oxygen can be bonded) such as ionic bond, covalent bond, metallic bond, and coordinate bond.

For example, the intermediate transparent layer 220 formed of a peroxide composition may include a $SiO_3$ or $SiO_4$ layer. The intermediate transparent layer 220 has a structure with improved chemical resistance and durability compared to a related art $SiO_2$ layer.

In more detail, in case of a transparent dielectric of an oxide such as $SiO_2$, as oxygen content of a predetermined amount is increased, a bond angle between an atom and an oxygen atom is increased, so that a crystal structure shrinks and becomes dense. In addition, since a bond with an oxygen atom is increased, transparency is increased.

Moreover, the conductive transparent layer 230 is formed on the intermediate transparent layer 220 and the conductive transparent layer 230 may be an Indium Tin Oxide (ITO). Here, oxygen may be additionally bonded to an ITO layer. Like this, since a predetermined amount of oxygen is added to the ITO layer, electrical conductivity may be improved.

A method of manufacturing the above plate member will be described in more detail with reference to FIG. 2.

Figure 2:
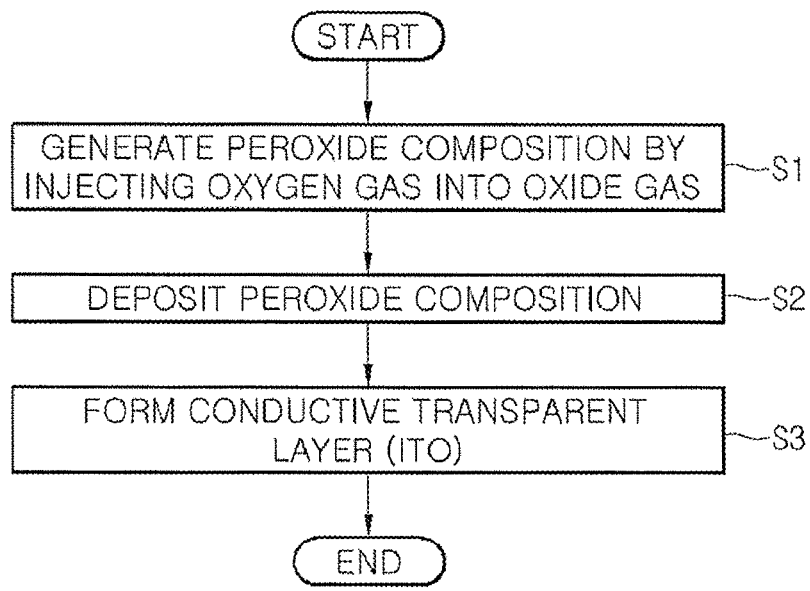
FIG. 2 is a flowchart illustrating a method of manufacturing a plate member for touch panel according to an embodiment.

FIG. 2 is a flowchart illustrating a method of manufacturing a plate member for touch panel according to an embodiment.

Referring to FIG. 2, a peroxide composition is generated by injecting oxygen gas into oxide gas in operation S1. As one example, oxygen gas is injected into oxide gas as $SiO_2$ gas, thereby generating a $SiO_3$ or $SiO_4$ peroxide composition.

Next, the peroxide composition is deposited on a transparent substrate to form an intermediate transparent layer in operation S2.

Next, a conductive transparent layer is formed on the intermediate transparent layer in operation S3. Here, the conductive transparent layer may be an ITO layer. At this point, the ITO layer may be further bonded with oxygen. According to a method of bonding more oxygen with the ITO layer, after an ITO peroxide composition, which is bonded with more oxygen by injecting oxygen gas into ITO gas, the ITO peroxide composition may be deposited on the intermediate transparent layer.

Hereinafter, the present invention will be described in more detail as follows according to embodiments.

Figure 3:
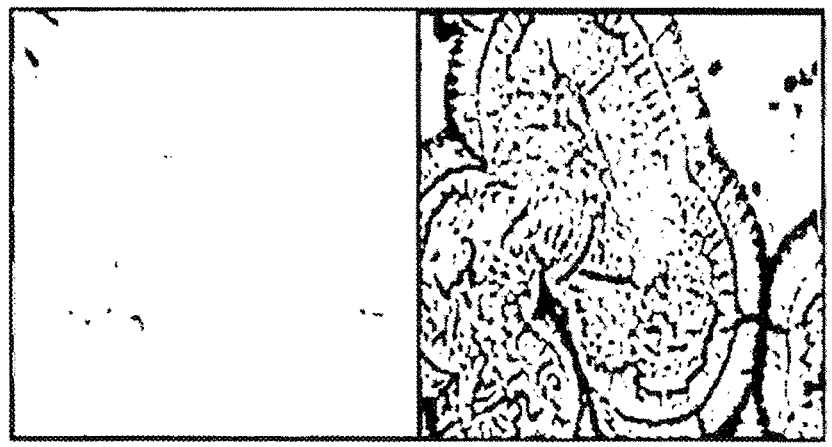
FIG. 3 is a view after a plate member for touch panel according to a comparison example is dipped in an etching solution.
Figure 4:
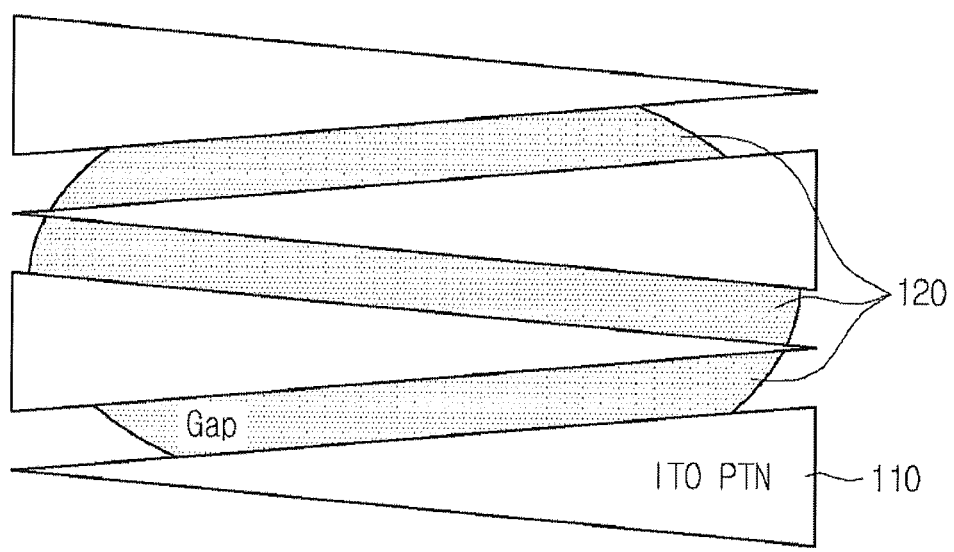
FIG. 4 is a top view of a related art touch panel.

Optical properties (such as haze and transmittance) and surface damage in the embodiments 1, 2, and 3 and the comparison example are experimented and their results are listed in Table 1. The embodiments 1, 2, and 3 include respective intermediate transparent layers formed by injecting each oxygen gas of 2~3%, 7%, and 15% into a $SiO_2$ layer. The comparison example includes an intermediate transparent layer formed of only $SiO_2$. At this point, the surface damage is determined after a plate member according to the embodiments 1, 2, and 3 is dipped in an etching solution for 1 min at a temperature of 45 C. Then, a picture after a member plate according to the comparison example is dipped into an etching solution is shown in FIG. 3. The left picture of FIG. 3 is captured by SMT6 with 200 times magnification and the right picture of FIG. 3 is captured by the SMT6 with 600 times magnification.

TABLE 1

| Sample | | Oxygen | Optical property | | Surface |
|---|---|---|---|---|---|
| Number | Thin layer | content | Haze | Transmittnace | damage |
| Comparison example | $SiO_2$ | No | 1.33 | 91.42 | Damaged |
| Embodiment 1 | $SiO_2 + O_2$ | 2~3% | 0.38 | 90.63 | Not damaged |
| Embodiment 2 | $SiO_2 + O_2$ | 7% | 0.44 | 91.56 | Not damaged |
| Embodiment 3 | $SiO_2 + O_2$ | 15% | 0.71 | 92.97 | Not damaged |

Referring to Table 1, the comparison example shows that a haze (stains) value is very high (i.e., 1.33) and also surface is damaged. Referring to FIG. 3, surface damage is more clearly shown. Like this, in the comparison example, surface damage occurs, thereby causing a crack of a conductive transparent layer. Therefore, its durability may be deteriorated.

On the contrary, in the embodiments 1, 2, and 3, haze (stains) values are 0.38, 0.44, and 0.71, respectively and thus hazes are highly maintained. Therefore, its durability may be improved without damage.

Moreover, transmittance, uniformity, haze, yellowish, and surface resistance of the embodiments 1 to 5 are measured and their results are listed in Table 2. The embodiments 1 to 5 include conductive transparent layers formed by bonding more oxygen with an ITO with a different oxygen process condition.

TABLE 2

| | Process condition | | Measurement result | | | | |
|---|---|---|---|---|---|---|---|
| | Oxygen injection amount [sccm] | Oxygen pressure [Torr] | Transmittance [%] | Uniformity [%] | Haze | Yellowish | Surface resistance |
| Embodiment 4 | 3 | 5 | 84.72 | 1.07 | 0.36 | 2.9925 | 410.27 |
| Embodiment 5 | 4 | 5 | 85.99 | 0.58 | 0.23 | 2.680625 | 293.46 |
| Embodiment 6 | 5 | 5 | 86.52 | 0.62 | 0.30 | 2.49875 | 307.65 |
| Embodiment 7 | 6 | 5 | 86.53 | 0.31 | 0.18 | 2.679375 | 310.80 |
| Embodiment 8 | 7 | 5 | 86.30 | 0.32 | 0.15 | 2.88 | 400.28 |

Referring to Table 2, if the ITO layer contains oxygen, a surface resistance value is the smallest in the embodiment 5 and its electrical property is excellent. However, if an optical property is considered, the embodiment 6 having a transmittance of 86.53 is more preferable.

In addition, referring to Tables 1 and 2, the embodiment 1 of Table 1 having the lowest haze value is preferable and if optical and electrical properties are considered, the embodiment 6 of Table 2 is preferable. Oxygen content proper for the two cases is about 3%.

Like this, by adjusting each oxygen amount contained in an intermediate transparent layer and/or a conductive transparent layer, a plate member may be manufactured with a priority on one of transmittance and electrical conductivity. Especially, according to the present invention, surface damage by an etching solution is drastically reduced in any case compared to the comparison example.

Any reference in this specification to one embodiment, an embodiment, example embodiment, etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The invention claimed is:

1. A plate member for touch panel, comprising:
a transparent substrate;
a transparent layer directly on the transparent substrate; and
a conductive transparent layer on the transparent layer,
wherein the transparent layer includes $SiO_3$ or $SiO_4$,
wherein one surface of the conductive transparent layer is in direct contact with only a surface of the transparent layer,
wherein the conductive transparent layer is patterned,
wherein the conductive transparent layer has an Indium Tin Oxide (ITO) peroxide composition,
wherein the transparent layer is configured such that when content of $SiO_3$ or $SiO_4$ of the transparent layer increases, transmittance of the transparent layer is increased accordingly.

2. The plate member according to claim 1, wherein the conductive transparent layer is formed by bonding oxygen with an Indium Tin Oxide (ITO).

* * * * *